Patented Sept. 20, 1932

1,878,164

UNITED STATES PATENT OFFICE

CHARLES MINDELEFF, OF JACKSON HEIGHTS, NEW YORK, ASSIGNOR TO LOUISE G. ROBINOVITCH, OF GOLDEN, COLORADO

CHLORINE PREPARATION

No Drawing.   Application filed August 3, 1928.   Serial No. 297,375.

This invention relates to the production of and the method of producing a new composition of matter, in solid form, as for example, a powder, so that the active chlorine can be kept for considerable periods of time without such deterioration as to lose efficiency. My preparation is such that when brought into mixture with an appropriate fluid, as, for example, water, it will produce a practically clear fluid that will have a volume of active chlorine in a predetermined form, as for example, a hypochlorite.

The advantage of a powdered form of chlorine for commercial use as contrasted with the liquid preparations now known to the art is obvious. It is, of course, easier to transport, because less bulky.

For many years, a solid form of active chlorine has been sought. Efforts have been made to fill this requirement, but no known method has heretofore operated to give the solution which I have invented.

As applied, for example, to the manufacture of a hypochlorite, the complete process comprises the following steps:

1. The absorption of an aqueous solution of a hypochlorite, as for example, a sodium hypochlorite, by an appropriate carrying agent, as for example, either dry sodium carbonate or dry potassium carbonate.

2. Drying the resultant product, which is an alkaline carbonate carrying an active chlorine content, either in a vacuum or by passing dry air over the composition. I prefer the vacuum method.

In selecting the aqueous solution of sodium hypochlorite referred to above, I select or prepare one that carries available chlorine greater in proportionate volume than the amount of chlorine desired to be obtained in my ultimate product. Thus, I have found that if I wished to have my product show an active chlorine content, in the form of a hypochlorite of, say, ten per cent, the primary hypochlorite solution should contain approximately twenty per cent of such chlorine. If such primary chlorine preparation, as for example, a hypochlorite, is prepared by the use of calcium hypochlorite, the fluid is drawn or syphoned off so as to carry as little as possible of the sludge, as it is advantageous to have this fluid as free of non-active substances as possible. As stated above, I then combine this fluid with an absorbent. In the case of dry sodium carbonate, absorption will be of about equal weights. Atmospheric conditions and temperature will, of course, have some influence on this. The drying process may be carried out in any way desired so long as resort is not had to excessive heat, which must be avoided.

The resultant solid or powder may be kept for considerable periods of time. When placed in solution with water, the result will be an active chlorine solution, for example, a sodium hypochlorite.

I have stated in detail the preferred practice of my composition, but it is to be understood that known chemical equivalents may be employed in place of the materials mentioned, without departing from the spirit of the invention or the scope of the subjoined claims.

I claim:

1. The method of producing a soluble active chlorine compound in solid or powder form, which consists in the absorption of a hypochlorite solution by an alkaline carbonate.

2. The method of producing a soluble active chlorine compound in solid or powder form, which consists of the absorption of a hypochlorite solution by an alkaline carbonate, and passing dry air over the resultant product.

3. The method of producing a soluble active chlorine compound in solid or powder form, which consists of the absorption of a hypochlorite solution by an alkaline carbonate, and drying the resultant product in a vacuum.

4. The method of producing a soluble hypochlorite compound in solid or powder form, which consists in the absorption of a hypochlorite solution by a dry alkaline carbonate.

5. The process of preparing a double salt of an alkaline carbonate and an alkali metal hypochlorite which consists in reacting upon a primary hypochlorite solution having a chlorine content higher than desired in the final product with a dry alkaline carbonate.

CHARLES MINDELEFF.